Sept. 8, 1970   R. E. WITSENHAUSEN-ADELMANN   3,526,951
METHOD FOR MAKING A CONNECTING DEVICE
Filed July 20, 1967
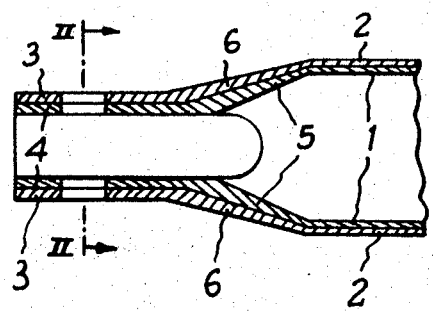
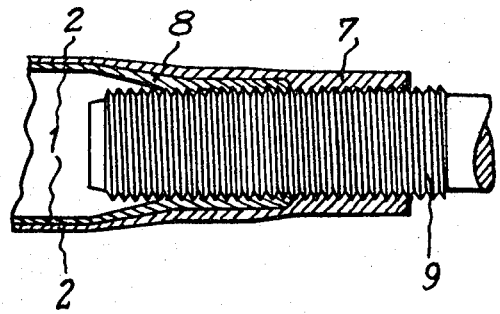
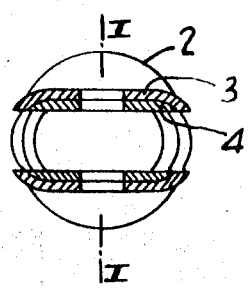
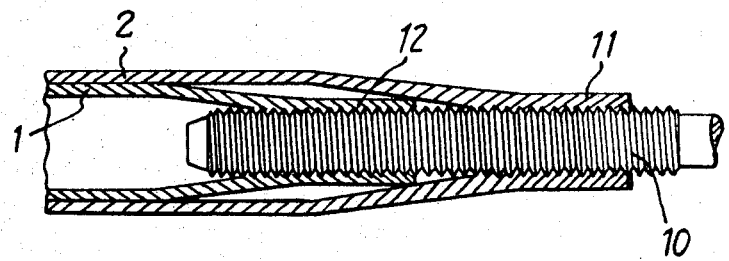
INVENTOR
ROBERT E. WITSENHAUSEN-ADELMAN
By Young + Thompson
ATTYS.

United States Patent Office 3,526,951
Patented Sept. 8, 1970

3,526,951
METHOD FOR MAKING A CONNECTING DEVICE
Robert E. Witsenhausen-Adelmann, Saint-Vallier, France
Filed July 20, 1967, Ser. No. 654,734
Claims priority, application France, July 20, 1966, 70,003
Int. Cl. B23p 11/00
U.S. Cl. 29—437
4 Claims

ABSTRACT OF THE DISCLOSURE

Connecting devices or brake rods are made by introducing two cylindrical coaxial tubes into one another so that the end of the outer tube extends outwardly beyond the end of the inner tube, deforming the inner and outer tube ends inwardly onto a threaded mandrel, and then withdrawing the threaded mandrel.

---

This invention relates to improvements in connecting devices or control rods for linear or rotational movements of various mechanical members.

The improvements relate more especially to a connecting device or rod for brakes, especially for aircraft.

The principal object is to achieve increased safety in the event of fracture of one of the two bodies constituting the connecting device or rod. The other advantages will appear in the following description.

For simplification, only connecting devices will be mentioned in what follows.

The procedure consists essentially in disposing two cylindrical tubes coaxially and forming or swaging at least one of the extremities of each tube upon a mandrel, so as to provide at least the said extremity and the connecting device of a means joining it with the vehicle brake device, said means being coupled simultaneously with the above mentioned two tubes.

Some examples, not limiting the scope of the invention, are shown in the accompanying diagrammatic drawings:

FIG. 1 is a diametral section on the plane I—I on FIG. 2 of one end of a connecting device according to a first form of the invention;

FIG. 2 is a transverse section on the plane II—II on FIG. 1;

FIG. 3 is a diametral section on one end of a connecting device according to a second form of the invention;

FIG. 4 is a diametral section of one end of a connecting device according to a third form of the invention.

The first form of the invention (FIGS. 1 and 2) comprise two variations. In the two cases, one tube is introduced into the other of two metallic tubes 1 and 2 of about the same length.

A first variation consists then in forming the ends 3 and 4 of the two tubes upon a mandrel, as by a machine for forming or removing material in the form of a cap or cover which is seen in section in FIG. 2. In this case, the cap or cover has a transverse section the area of which is less than that of the tube.

In the two variations, the tubes 1 and 2 may be separated of superfluous thickness. The method comprises simultaneous retention on the internal mandrel in such manner to give it the selected thickness and diameters, such as that which is described in the prior French Pat. 1,189,383, then flattening the end on another internal mandrel, in general without re-entrance except in that it concerns the coupling 5 and 6 with the cylindrical part, and finally machining or forming the cap. It can then be seen that it is possible to select the dimensions of the tube in such a way that the areas of the transverse sections of the cap and of the tubes may be well determined, and in particular equal if it is desired that the connecting device shall have in all parts a constant resistance to traction.

The second form (FIG. 3) has for a secondary object to permit easy adjustment of the length of the connecting device.

In this variation the external tube 2 is longer than the internal tube 1.

The two tubes are formed at their ends 7 and 8 on a mandrel or spindle 9, according to known procedure. Preferably for forming or swaging one commences by forming the end 7 of the external tube on the mandrel 9, then one proceeds in the same way for the assembly of the exterior tube 2 and the end 8 of the interior tube 1. A part of the frustoconical coupling is disposed between ends of the tubes and the cylindrical parts.

The mandrel, when it is threaded is removed by screwing, then replaced by a coupling rod of the shape selected for the end of the connecting device. The adjustment of the length of the connecting device can then be effected.

It can be seen that the shaped part replacing the mandrel 9 is independently separable from the two tubes 1 and 2. In the case of breakage of one or both, the connecting device will continue to perform its function although having a reduced resistance. A certain safety of use nevertheless results.

The third form (FIG. 4) consists in using one or the other of the two tubes 1 and 2 of which the ends are formed or swaged in known manner. Preferably the cylindrical middle parts are in contact.

The end 12 of the inner tube is entirely swaged, then it is introduced, with the mandrel 10 in place in its position in the outer tube 2 which is then swaged or spun onto the mandrel 10.

This latter is finally removed and replaced by the shape predetermined for the end of the connecting device. This shape is then screwed in the ends of the two tubes 1 and 2 and assures the same safety as the connecting device according to the form of FIG. 3.

Reinforcing sleeves or bushes may be placed on the ends of the forms shown in FIGS. 3 and 4. In place of the threaded mandrel, one may, in certain cases, use a coupling mandrel which then forms a part of the shaped end of the connecting device.

The process according to the invention provides at one and/or other end, either a connecting device with a shaped cap or shell in the tubes 1 and 2 (FIG. 1) or a connecting device with a detachable shaped end (FIGS. 3 and 4).

It is to be understood, that the known heating operations, re-heating, quenching, tempering, and hardening may be interposed between the operations of shaping according to the nature of the metal of the tubes.

What is claimed is:

1. A method for making a connecting device or brake rod comprising the steps of introducing two cylindrical coaxial tubes into one another so that one of the outer tube ends extends outwardly beyond one of the inner tube ends, deforming said inner and outer tube ends inwardly onto a threaded mandrel such that the inner tube end is deformed into threaded engagement with the mandrel and the outer tube end is deformed into threaded engagement with the mandrel outwardly of the inner tube end so as to form a brake rod that will maintain engagement in the event one of the tubes of the assembly fails, withdrawing said mandrel and introducing in the place of the mandrel a screw threaded member in engagement with both the inner and outer tubes.

2. A method as claimed in claim 1. in which the two tubes are introduced one within the other, and then the mandrel is introduced in the tube ends, and then both tube ends are deformed into engagement with the mandrel.

3. A method as claimed in claim 1, in which the mandrel is introduced into the inner tube, the inner tube is then deformed onto the mandrel, and then the mandrel and the inner tube are introduced into the outer tube and the end of the outer tube is deformed onto the mandrel.

4. A method as claimed in claim 1, and flattening the other ends of the two tubes on a flat mandrel inserted within said other ends of the two tubes.

References Cited

UNITED STATES PATENTS

| 2,441,580 | 5/1948 | Mageoch. | |
|---|---|---|---|
| 2,752,179 | 6/1956 | Le Febure. | |
| 3,239,930 | 3/1966 | Violleau | 29—516 |

CHARLIE T. MOON, Primary Examiner

U.S. Cl. X.R.

10—153; 29—175, 456, 516; 188—196